US009798989B2

(12) United States Patent
Galvin, Jr. et al.

(10) Patent No.: US 9,798,989 B2
(45) Date of Patent: *Oct. 24, 2017

(54) SELECTING COLLABORATORS FOR PROJECTS

(71) Applicant: International Business Machines Corporation, Armonk, NY (US)

(72) Inventors: James P. Galvin, Jr., Georgetown, KY (US); Andrew L. Schirmer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/010,948

(22) Filed: Aug. 27, 2013

(65) Prior Publication Data
US 2014/0136439 A1    May 15, 2014

Related U.S. Application Data

(63) Continuation of application No. 13/673,200, filed on Nov. 9, 2012.

(51) Int. Cl.
G06Q 10/00 (2012.01)
G06Q 10/06 (2012.01)
G06Q 10/10 (2012.01)

(52) U.S. Cl.
CPC . G06Q 10/063118 (2013.01); G06Q 10/1053 (2013.01)

(58) Field of Classification Search
CPC ................... G06Q 10/063118; G06Q 10/1053
(Continued)

(56) References Cited

U.S. PATENT DOCUMENTS 7,367,808 B1 * 5/2008 Frank ................. G06Q 10/06
434/219
7,603,626 B2 * 10/2009 Williams ............ G06Q 10/10
715/201

(Continued)

FOREIGN PATENT DOCUMENTS

AU      2003203408      *  1/2004   ............ G06F 17/30
GB      2471329 A       12/2010
WO      WO2014033704    *  3/2014

OTHER PUBLICATIONS

GeoChat, Feb. 5, 2009, inSTEDD, http://instedd.org/technologies/geochat/, p. 1-5.*

(Continued)

*Primary Examiner* — Beth V Boswell
*Assistant Examiner* — Joseph Waesco
(74) *Attorney, Agent, or Firm* — Brian J. Colandreo, Esq.; Jeffrey T. Placker, Esq.; Holland & Knight LLP

(57) ABSTRACT

A method, computer program product, and system for selecting collaborators is described. A set of candidates for collaboration with an initiator is received. Initial contact scores for one or more member of the set of candidates are determined based upon, at least in part, one or more of initial availability and initial willingness. An initial ranking order for the set of candidates is determined. A member is selected from the set based upon, at least in part, the initial ranking order. An invitation to collaborate is provided to the selected member. If the invitation is accepted, a communication channel connection is established between the initiator and the selected member.

13 Claims, 6 Drawing Sheets

(58) Field of Classification Search
USPC .......................................................... 705/7.17
See application file for complete search history.

(56) References Cited

U.S. PATENT DOCUMENTS

| | | | |
|---|---|---|---|
| 7,797,293 B2 | 9/2010 | Pabla et al. | |
| 7,797,642 B1* | 9/2010 | Karam | G06Q 10/107 345/419 |
| 8,756,501 B1* | 6/2014 | Karam | H04L 51/32 715/700 |
| 8,819,536 B1* | 8/2014 | Lucovsky | G06Q 10/10 715/205 |
| 8,954,372 B2* | 2/2015 | Biehl | G06N 5/02 706/52 |
| 2004/0186762 A1* | 9/2004 | Beaven | G06Q 10/0633 705/7.27 |
| 2005/0033623 A1* | 2/2005 | Zemborain | G06Q 10/06314 705/7.24 |
| 2007/0124188 A1* | 5/2007 | Herman et al. | 705/8 |
| 2007/0135110 A1 | 6/2007 | Athale et al. | |
| 2007/0219816 A1* | 9/2007 | Van Luchene | G06Q 10/06 705/80 |
| 2008/0077461 A1* | 3/2008 | Glick | G06Q 10/06 705/7.29 |
| 2009/0012833 A1 | 1/2009 | Kuhlke et al. | |
| 2009/0234686 A1* | 9/2009 | Chakra | G06Q 50/265 705/325 |
| 2009/0234874 A1 | 9/2009 | Sylvain | |
| 2010/0049534 A1* | 2/2010 | Whitnah | G06Q 30/02 705/319 |
| 2010/0162135 A1* | 6/2010 | Wanas | G06Q 10/10 715/753 |
| 2010/0205541 A1* | 8/2010 | Rapaport | G06Q 10/10 715/753 |
| 2010/0235501 A1* | 9/2010 | Klemm | A61K 9/5169 709/224 |
| 2010/0325214 A1* | 12/2010 | Gupta | G06Q 10/10 709/206 |
| 2011/0016409 A1* | 1/2011 | Grosz | G06F 17/3028 715/753 |
| 2011/0184772 A1* | 7/2011 | Norton | G06Q 10/02 705/7.18 |
| 2012/0023170 A1* | 1/2012 | Matignon | G06Q 10/0637 709/205 |
| 2012/0311460 A1* | 12/2012 | Boyd | G06Q 10/109 715/752 |
| 2014/0046862 A1* | 2/2014 | Weingarten | G06Q 10/00 705/321 |
| 2014/0358607 A1* | 12/2014 | Gupta | G06Q 10/063112 705/7.14 |

OTHER PUBLICATIONS ter Hofte et al., "Contest-Aware Communication with Live Contacts," CSCW '04, Nov. 6-10, 2004, pp. 1-2.

* cited by examiner

SELECTING COLLABORATORS FOR PROJECTS

RELATED APPLICATIONS

The subject application is a continuation application of U.S. patent application with Ser. No. 13/673,200, filed on Nov. 9, 2012, the entire content of which is herein incorporated by reference.

TECHNICAL FIELD

This disclosure relates to selecting one or more collaborators.

BACKGROUND

In various endeavors groups and/or individuals may desire to collaborate with other groups and/or individuals. For example, when engaging in a business-related project one professional may find it useful to receive advice or other assistance from a recognized expert in the relevant filed, an individual who has previously completed a similar project, a team that is currently working on a related project, and so on. Individuals and/or groups may collaborate with each other using a variety of electronic communication means.

BRIEF SUMMARY OF THE DISCLOSURE

According to one aspect of the disclosure, a computer-implemented method includes receiving, by one or more computing devices, a set of candidates for collaboration with an initiator. The method further includes determining, by the one or more computing devices, a first initial contact score for a first member of the set of candidates based upon, at least in part, one or more of a first initial availability associated with the first member and a first initial willingness associated with the first member. The method further includes determining, by the one or more computing devices, a second initial contact score for a second member of the set of candidates based upon, at least in part, one or more of a second initial availability associated with the second member and a second initial willingness associated with the second member. The method further includes determining, by the one or more computing devices, an initial ranking order for the set of candidates based upon, at least in part, one or more of the first initial contact score and the second initial contact score. The method further includes selecting, by the one or more computing devices, a first selected member from the set of candidates based upon, at least in part, the initial ranking order. The method further includes providing, by the one or more computing devices, a first invitation to the first selected member to collaborate. The method further includes, if the first invitation is accepted, establishing, by the one or more computing devices, a communication channel connection between the first selected member and the initiator.

The method further includes, if the first invitation is not accepted, associating, by the one or more computing devices, a first subsequent contact score with the first selected member, wherein the first subsequent contact score is based upon, at least in part, one or more of a first subsequent availability associated with the first selected member and a first subsequent willingness associated with the first selected member. The method further includes, if the first invitation is not accepted, determining, by the one or more computing devices, a subsequent ranking order for the portion of the set of candidates based upon, at least in part, one or more of the first initial contact score, the second initial contact score, and the first subsequent contact score. The method further includes, if the first invitation is not accepted, selecting, by the one or more computing devices, a second selected member from the set of candidates based upon, at least in part, the subsequent ranking order. The method further includes, if the first invitation is not accepted, providing, by the one or more computing devices, a second invitation to the second selected member to collaborate.

One or more of the following features may be included. One or more of the first initial willingness, the second initial willingness, and the first subsequent willingness may be determined based upon, at least in part, determining a strength of a relationship with the initiator. One or more of the first initial willingness, the second initial willingness, and the first subsequent willingness may be determined based upon, at least in part, determining an online status. One or more of the first initial willingness, the second initial willingness, and the first subsequent willingness may be determined based upon, at least in part, determining an involvement in a competing activity. One or more of the first initial willingness, the second initial willingness, and the first subsequent willingness may be determined based upon, at least in part, determining a historical collaboration pattern. One or more of the first initial availability, the second initial availability, and the first subsequent availability may be determined based upon, at least in part, determining an online status. One or more of the first initial availability, the second initial availability, and the first subsequent availability may be determined based upon, at least in part, identifying a recent online activity. One or more of the first initial availability, the second initial availability, and the first subsequent availability may be determined based upon, at least in part, identifying a calendar entry.

According to another aspect of the disclosure, a computer program product resides on a computer readable storage medium and has a plurality of instructions stored on it. When executed by a processor, the instructions cause the processor to perform operations including receiving a set of candidates for collaboration with an initiator. The operations further include determining a first initial contact score for a first member of the set of candidates based upon, at least in part, one or more of a first initial availability associated with the first member and a first initial willingness associated with the first member. The operations further include determining a second initial contact score for a second member of the set of candidates based upon, at least in part, one or more of a second initial availability associated with the second member and a second initial willingness associated with the second member. The operations further include determining an initial ranking order for the set of candidates based upon, at least in part, one or more of the first initial contact score and the second initial contact score. The operations further include selecting a first selected member from the set of candidates based upon, at least in part, the initial ranking order. The operations further include providing a first invitation to the first selected member to collaborate. The operations further include, if the first invitation is accepted, establishing a communication channel connection between the first selected member and the initiator.

The operations further include, if the first invitation is not accepted, associating a first subsequent contact score with the first selected member, wherein the first subsequent contact score is based upon, at least in part, one or more of a first subsequent availability associated with the first selected member and a first subsequent willingness associated with the first selected member. The operations further include, if the first invitation is not accepted, determining a subsequent ranking order for the set of candidates based upon, at least in part, one or more of the first initial contact score, the second initial contact score, and the first subsequent contact score. The operations further include, if the first invitation is not accepted, selecting a second selected member from the set of candidates based upon, at least in part, the subsequent ranking order. The operations further include, if the first invitation is not accepted providing a second invitation to the second selected member to collaborate.

One or more of the following features may be included. One or more of the first initial willingness, the second initial willingness, and the first subsequent willingness may be determined based upon, at least in part, determining a strength of a relationship with the initiator. One or more of the first initial willingness, the second initial willingness, and the first subsequent willingness may be determined based upon, at least in part, determining an online status. One or more of the first initial willingness, the second initial willingness, and the first subsequent willingness may be determined based upon, at least in part, determining an involvement in a competing activity. One or more of the first initial willingness, the second initial willingness, and the first subsequent willingness may be determined based upon, at least in part, determining a historical collaboration pattern. One or more of the first initial availability, the second initial availability, and the first subsequent availability may be determined based upon, at least in part, determining an online status. One or more of the first initial availability, the second initial availability, and the first subsequent availability may be determined based upon, at least in part, identifying a recent online activity. One or more of the first initial availability, the second initial availability, and the first subsequent availability may be determined based upon, at least in part, identifying a calendar entry.

According to another aspect of the disclosure, a computing system includes one or more processor and one or more memory architecture coupled with the at one or more processors. The one or more processors are configured to receive a set of candidates for collaboration with an initiator. The one or more processors are configured to determine a first initial contact score for a first member of the set of candidates based upon, at least in part, one or more of a first initial availability associated with the first member and a first initial willingness associated with the first member. The one or more processors are configured to determine a second initial contact score for a second member of the set of candidates based upon, at least in part, one or more of a second initial availability associated with the second member and a second initial willingness associated with the second member. The one or more processors are configured to determine an initial ranking order for the set of candidates based upon, at least in part, one or more of the first initial contact score and the second initial contact score. The one or more processors are configured to select a first selected member from the set of candidates based upon, at least in part, the initial ranking order. The one or more processors are configured to provide a first invitation to the first selected member to collaborate. The one or more processors are configured to, if first invitation is accepted, establish a communication channel connection between the first selected member and the initiator.

The one or more processors are configured to, if the first invitation is not accepted, associate a first subsequent contact score with the first selected member, wherein the first subsequent contact score is based upon, at least in part, one or more of a first subsequent availability associated with the first selected member and a first subsequent willingness associated with the first selected member. The one or more processors are configured to, if the first invitation is not accepted, determine a subsequent ranking order for the portion of the set of candidates based upon, at least in part, one or more of the first initial contact score, the second initial contact score, and the first subsequent contact score. The one or more processors are configured to, if the first invitation is not accepted, select a second selected member from the set of candidates based upon, at least in part, the subsequent ranking order. The one or more processors are configured to, if the first invitation is not accepted, provide a second invitation to the second selected member to collaborate.

One or more of the following features may be included. One or more of the first initial willingness, the second initial willingness, and the first subsequent willingness may be determined based upon, at least in part, determining a strength of a relationship with the initiator. One or more of the first initial willingness, the second initial willingness, and the first subsequent willingness may be determined based upon, at least in part, determining an online status. One or more of the first initial willingness, the second initial willingness, and the first subsequent willingness may be determined based upon, at least in part, determining an involvement in a competing activity. One or more of the first initial willingness, the second initial willingness, and the first subsequent willingness may be determined based upon, at least in part, determining a historical collaboration pattern. One or more of the first initial availability, the second initial availability, and the first subsequent availability may be determined based upon, at least in part, determining an online status. One or more of the first initial availability, the second initial availability, and the first subsequent availability may be determined based upon, at least in part, identifying a recent online activity. One or more of the first initial availability, the second initial availability, and the first subsequent availability may be determined based upon, at least in part, identifying a calendar entry.

According to one aspect of the disclosure, a computer-implemented method includes receive, by one or more computing devices, a set of candidates for collaboration with an initiator. The method further includes determining, by the one or more computing devices, a first initial contact score for a first member of the set of candidates based upon, at least in part, one or more of a first initial availability associated with the first member and a first initial willingness associated with the first member. The method further includes determining, by the one or more computing devices, a second initial contact score for a second member of the set of candidates based upon, at least in part, one or more of a second initial availability associated with the second member and a second initial willingness associated with the second member. The method further includes determining, by the one or more computing devices, an initial ranking order for the set of candidates based upon, at least in part, one or more of the first initial contact score and the second initial contact score. The method further includes selecting, by the one or more computing devices, a first selected member from the set of candidates based upon, at least in part, the initial ranking order. The method further includes providing, by the one or more computing devices, a first invitation to the first selected member to collaborate. The method further includes, if the first invitation is accepted, establishing, by the one or more computing devices, a communication channel connection between the first selected member and the initiator.

The method further includes, if the first invitation is not accepted, associating, by the one or more computing devices, a first subsequent contact score with the first selected member, wherein the first subsequent contact score is based upon, at least in part, one or more of a first subsequent availability associated with the first selected member and a first subsequent willingness associated with the first selected member. The method further includes, if the first invitation is not accepted, determining, by the one or more computing devices, a subsequent ranking order for the portion of the set of candidates based upon, at least in part, one or more of the first initial contact score, the second initial contact score, and the first subsequent contact score. The method further includes, if the first invitation is not accepted, selecting, by the one or more computing devices, a second selected member from the set of candidates based upon, at least in part, the subsequent ranking order. The method further includes, if the first invitation is not accepted, providing, by the one or more computing devices, a second invitation to the second selected member to collaborate. One or more of the first initial willingness, the second initial willingness, and the first subsequent willingness is determined based upon, at least in part, determining a historical collaboration pattern. One or more of the first initial availability, the second initial availability, and the first subsequent availability is determined based upon, at least in part, identifying a recent online activity.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
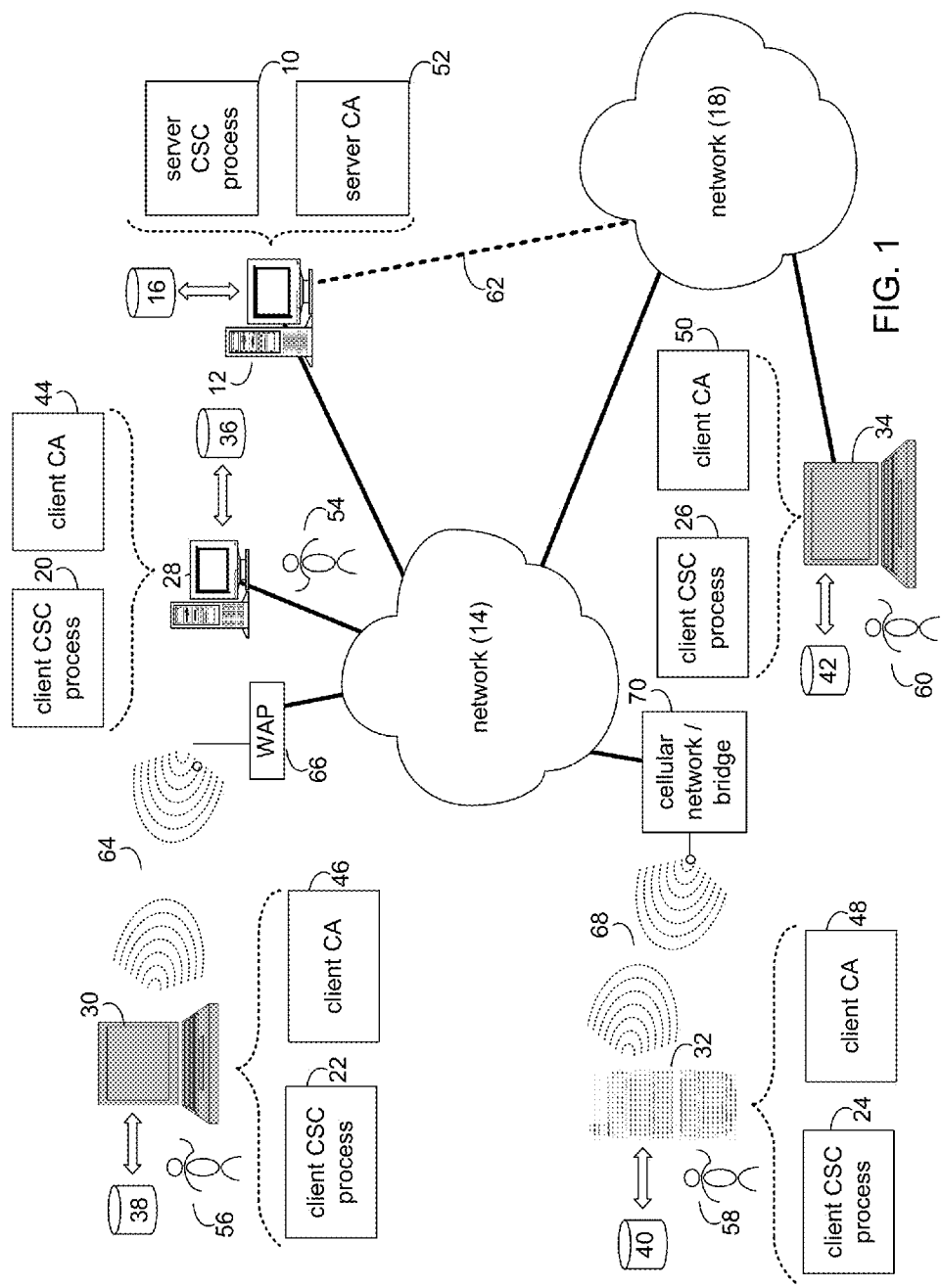
FIG. 1 is a diagrammatic view of a collaborator selection and contacting process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In business and other settings, groups and individuals may find it useful to collaborate (e.g., through electronic communicate or otherwise) with a number of other individuals and/or groups. For example, while working on a particular project, an individual may find it useful to discuss aspects the project with a subject matter expert, a colleague with similar experience, a knowledgeable manager, and/or a variety of other relevant groups and individuals. In certain embodiments, individuals may have access to various lists of possible collaborators, which may be created and organized in a variety of ways. For example, a list of collaborators may include all of an individual's coworkers, all of the individuals (or groups) included on a particular project or projects, a set of workers determined based on hierarchical analysis of a business organization, a number of subject matter experts, and so on. In certain embodiments, various contact information may be associated with individuals (and/or groups) included in a list of potential collaborators. For example, telephone numbers, email addresses, social media information, physical addresses, and so on may be associated with one or more individuals included in a list of potential collaborators. For various reasons, however, it may be difficult to determine which individual(s) (or groups) in a list of potential collaborators may be the most appropriate individual(s) (or groups) to contact for a particular collaboration. In certain embodiments, certain individuals on a list of potential collaborators may be unavailable or may be unwilling to collaborate. Further, such unavailability and unwillingness may change over time, including over a time period during which collaborators are still needed. As such, individuals seeking collaborators may sometimes be required to spend significant time deciding which potential collaborator(s) to contact, composing invitations to collaborate, parsing responses to those invitations, finding additional/alternate collaborators based on the response of earlier-invited collaborators, and so on.

A Collaborator Selection and Contact ("CSC") process may address these and other issues. For example, a CSC may facilitate selection of one or more individuals (and/or groups), from a list of potential collaborators, who may be more likely to be available and willing to collaborate. A CSC process may facilitate establishing a communication link between individuals seeking collaboration and one or more willing and available collaborators, such as a potential collaborator, from a list of collaborators, who has been identified as more likely to be available and willing to collaborate. In certain embodiments, in addition to selecting a preferred collaborator from an pre-existing list of collaborators, a CSC process may facilitate determining whether the preferred collaborator is actually able and/or willing to collaborate, and establishing a communication link between the collaborator and the individual seeking collaboration so that the individuals may proceed with the collaboration.

Referring now to FIG. 1, a CSC process may be coupled to a computer or computer network. For example, server CSC process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server CSC process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client CSC processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client CSC processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the CSC process may be a server-side process (e.g., which may be implemented via server CSC process 10), in which all of the functionality of the CSC process may be executed on a server computer (e.g., server computer 12). In an embodiment, the CSC process may be a client-side process (e.g., which may be implemented via one or more of client CSC processes 20, 22, 24, 26), in which all of the functionality of the CSC process may be executed on a client computing device (e.g., one or more of client electronic devices 28, 30, 32, 34). In an embodiment, the CSC process may be a hybrid server-client process (e.g., which may be implemented by server CSC process 10 and one or more of client CSC processes 20, 22, 24, 26), in which at least a portion of the functionality of the CSC process may be implemented via server computer 12 and at least a portion of the functionality of the CSC process may be implemented via one or more client computing devices (e.g., one or more of client electronic devices 28, 30, 32, 34).

In certain embodiments, a CSC process may be a stand-alone process. In certain embodiments, a CSC process may operate as part of, or in conjunction with, one or more other processes and/or may include one or more other processes. For example, in certain embodiments, a CSC process may be included in (or may operate in conjunction with) a business flow control application, a project management application, and/or a communication application, and so on.

A communication application ("CA") (or communication process) may operate (and/or reside) on a client device (e.g., client CA 44, operating on client electronic device 28; client CA 46, operating on client electronic device 30; client CA 48, operating on client electronic device 32; or client CA 50, operating on client electronic device 34). A client CSC process (e.g., client CSC process 20) or a server CSC process (e.g., server CSC process 10) may be in communication with a client CA (e.g., client CA 44) or may be part of a client CA.

A CA may additionally or alternatively operate (and/or reside) on a server device (e.g., server CA 52, operating on server computer 12 or another server CA (not shown), operating on another server computer (not shown)). A server CSC process (e.g., server CSC process 10) or a client CSC process (e.g., client CSC process 20) may be in communication with a server CA (e.g., server CA 52) or may be a part of a server CA.

A CA (or process) may be an application (or process) that facilitates electronic communication between groups and/or individuals. For example, a CA may facilitate sending and receiving text messages, emails, telephone calls, video-calls, and so on. A CA may include, for example, Lotus Sametime® Unified Telephony or an application facilitating Voice over Internet Protocol (VoIP) calls. (Lotus and Sametime are trademarks of International Business Machines Corporation in the United States, other countries or both.) A CA may additionally/alternatively include an email application, a text-messaging application, a social networking application, and so on.

Users 54, 56, 58, 60 may access a CSC process in various ways. For example, these users may access server CSC process 10 directly through the device on which a client process (e.g., client CSC processes 20, 22, 24, 26) is executed, namely client electronic devices 28, 30, 32, 34. Users 54, 56, 58, 60 may access server CSC process 10 directly through network 14 and/or through secondary network 18. Further, server computer 12 (i.e., the computer that executes server CSC process 10) may be connected to network 14 through secondary network 18, as illustrated with phantom link line 62. Users 54, 56, 58, 60 may also access a client or server CA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client CSC process 20 will be described for illustrative purposes. It will be understood that client CSC process 20 may, for example, interact and/or communicate with a server CSC process such as server CSC process 10 and/or may be executed within one or more applications that allow for communication with other server and/or client CSC processes. This is not intended to be a limitation of this disclosure, as other configurations are possible (e.g., CSC process 20 may include stand-alone client processes and/or stand-alone server processes). For example, some implementations may include one or more of client CSC processes 22, 24, 26 or server CSC process 10 in place of or in addition to client CSC process 20.

Figure 2:
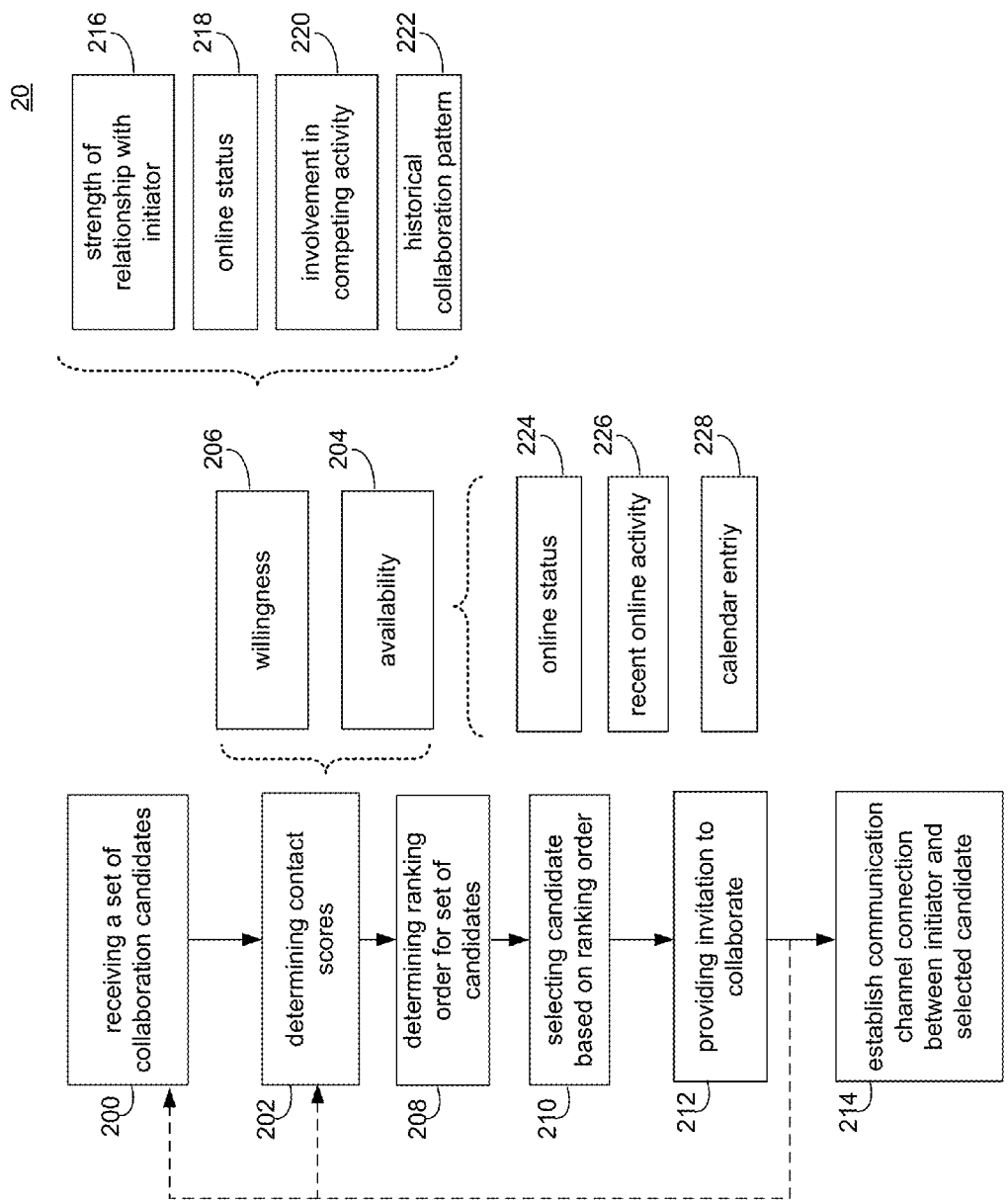
FIG. 2 is a flowchart of a process executed by the collaborator selection and contacting process of FIG. 1.

Referring now also to FIG. 2, there is shown a diagrammatic view of an example process that may be implemented by a CSC process, e.g., client CSC process 20. Client CSC process 20 may receive 200 a set of candidates for collaboration with an initiator (i.e., may receive 200 a set of potential collaborators). (As used herein, "initiator" may refer to an individual or group of individuals interested in collaborating with one or more other groups and/or individuals. In certain embodiments an initiator may implement CSC process 20 on his own behalf. In certain embodiments, an administrator may implement CSC process 20 on behalf of an initiator in order to facilitate selection of collaborators for the initiator.) In certain embodiments, CSC process 20 may receive a set of candidates from one or more other applications or processes and/or may receive 200 a predetermined set of candidates for collaboration (e.g., a set of candidates provided by an administrator or initiator). The received 200 set of candidates may include various information associated with one or more of the candidates in the set regarding contact, profile, and/or other information about the candidates. In certain embodiments, CSC process 20 may present the received 200 set to the initiator (or an administrator) in a variety of ways (e.g., as a "buddy list"). In certain embodiments, the received 200 set, the presentation of the received 200 set, the information associated with the received 200 set or members thereof, and so on may be customizable by the initiator and/or an administrator, and so on. For example, an initiator may designate certain collaborators who should or should not be part of the received 200 set, may control the display settings for a representation of the received 200 set, may enter and/or amend contact and other information associated with members of the received 200 set, and so on.

CSC process 20 may determine 202 a contact score for one or more members of the set of candidates (i.e., may determine 202 a contact score for one or more potential collaborators). A contact score may represent a measure of the likelihood that the scored candidate will be interested in, suitable to, and/or available to collaborate with the initiator. In certain embodiments, CSC process 20 may determine 202 an initial contact score (i.e., a first score for a candidate with respect to a particular instance of desired collaboration). In certain embodiments CSC 20 process may determine 202 a subsequent contact score (i.e., a second, third, and so on score for a candidate with respect to a particular instance of desired collaboration). In certain embodiments, CSC process 20 may determine 202 a contact score (e.g., an initial contact score and/or a subsequent contact score) based on a previous score (and/or previous score information) that may be stored on one or more forms of computer-readable media. For example, in certain embodiments, an initial contact score for a potential collaborator may be determined 202 based upon a contact score that was determined 202 during a prior search for collaborators.

A contact score may be based upon, at least in part, availability 204 associated with the scored member of the set of candidates. Availability 204 may be an indication of whether a particular candidate is actually available to collaborate on a particular project at a particular time (i.e., whether the potential collaborator is reachable via an electronic communication channel and/or otherwise able to contribute to a collaboration). For example, availability 204 may include an indication of whether a candidate currently (or potentially) has access to a telephone or computer, whether the candidate is irredeemably occupied with another matter, and so on.

As will be discussed in greater detail below, availability 204 may be based on various factors. For example, CSC process 20 may determine availability 204 based upon, at least in part, a record of communication devices/channels available for use by the candidate, a record of communication devices/channels being used by candidate, a candidate's current location and/or movement information, a candidates "nearness" to an initiator or communication device/channel, the preference information of the collaborator, the initiator and/or an administrator, various historical activities of the collaborator, the nature of the collaboration and so on.

A contact score may additionally/alternatively be based upon, at least in part, willingness 206 associated with the scored member of the set of candidates. Willingness 206 may be an indication of whether a particular candidate is interested in (i.e., "willing" to) collaborating on a particular project at a particular time. For example, willingness 206 may include an indication of whether a candidate is disposed to collaborate (i.e., wants to collaborate) with a particular collaborator, on a particular project, at a particular time, and so on.

As will be discussed in greater detail below, willingness 206 may be based on a variety of factors. For example, CSC process 20 may determine willingness 206 based upon, at least in part, preference information of the collaborator, the initiator and/or an administrator, historical activities of the collaborator, current activities of the collaborator, and so on.

In certain embodiments, CSC process 20 may determine 202 a contact score for multiple members of the set of candidates. For example, if a received 200 set of collaboration candidates includes twenty candidates, CSC process 20 may determine 202 a contact score (e.g., an initial contact score) for each of the twenty candidates. CSC process 20 may determine 202 a contact score for multiple members of a set of candidates based upon determining a willingness and/or an availability for each of the respective multiple members.

CSC process 20 may determine 208 a ranking order for the set of candidates based upon, at least in part, the determined 202 contact score. As noted above, it may be useful to select a particular, optimal potential collaborator from among a set of potential collaborators. As such, CSC process 20 may determine 208 a ranking order indicating that certain candidates in an received 200 set may be more appropriate for a particular collaboration. The determined 208 ranking order may be based upon, at least in part, the various contact scores determined 202 by CSC process 20 for the various members of the set of candidates. For example, CSC process 20 may determine 208 an initial ranking order based upon determined 202 initial contact scores, which may in turn be based upon, for example, determined initial willingness 206 and determined initial availability 208. In certain embodiments, as will be discussed in greater detail below, a change in circumstances following, for example, an initial determination 208 of ranking order may result in CSC process 20 determining 208 a subsequent ranking order based upon, at least in part, determined 202 subsequent contact scores (and/or initial contact scores), which may in turn be based upon, for example, determined subsequent willingness 206 and subsequent availability 204 (and/or determined initial willingness 206 and initial availability 204).

CSC process 20 may select 210 one or more members of the set of candidates based upon, at least in part, the determined 210 ranking order. For example, based on a determined 208 initial ranking order CSC process 20 may select 210 for a collaboration invitation the candidate (i.e., potential collaborator) with the top rank in the determined 210 ranking order. In certain embodiments, CSC process 20 may similarly select 210 for a collaboration invitation the candidate with a top rank in determined 210 subsequent ranking order. In certain embodiments, a determined 210 subsequent ranking order may be similar, in certain aspects, to a determined 210 initial ranking order. For example, the "top" candidate in the order may be the same in both the initial and subsequent rankings. In certain embodiments, a determined 210 subsequent ranking order may vary, in certain aspects, from a determined 210 initial ranking order. For example, change in circumstances after the initial ranking may result in the subsequent willingness 206 and availability 204 of a potential collaborator changing from the initial willingness 206 and availability 204 of that potential collaborator. This may result in a change in the subsequent determined 210 ranking order from the initial determined 210 ranking order and, accordingly, may result in selection 210 of a different candidate depending on the reference ranking order.

It will be understood that multiple "subsequent" rankings may be determined 210, based, for example, on multiple determined 202 subsequent contact scores. For example, a change in circumstances (e.g., a change in availability and/or willingness of certain potential collaborators or a change in the parameters of the collaboration desired such as a change in subject matter, time frame, and so on) may result in CSC process 20 determining 202 a second round of subsequent contact scores, based upon which CSC process 20 may determine 208 a second subsequent ranking order. It will also be understood, as noted above, that such multiple subsequent ranking orders may differ in whole or in part from each other and/or an initial ranking order.

CSC process 20 may provide 212 an invitation to the selected 210 potential collaborator to collaborate with the initiator. An invitation may be provided 212 to the selected 210 potential collaborator in a variety of known ways. For example, based on contact information associated with a profile of the selected 210 potential collaborator, CSC process 20 may attempt to contact the selected 210 potential collaborator using email, a chat application, telephone(s), video chat application, a shared file repository, and so on (as facilitated, for example, through one or more CAs).

A provided 212 invitation may include various levels of personalization and/or detail. For example, in certain embodiments, a provided 212 invitation may include a general request to collaborate with a particular initiator on a particular project and/or various levels of detail regarding the particular initiator, particular project, or particular type of collaboration. For example, CSC process 20 may provide 212 an email to a potential collaborator identifying the initiator, the subject matter of the collaboration, and so on. Various other details may also be provided such as, for example, the amount of time the collaboration is expected to take, deadlines associated with the collaboration, the level of expertise desired in a collaborator, other team members associated with the project to which the collaboration is related, related projects, other potential (and/or confirmed) collaborators, and so on. CSC process 20 may provide 212 an invitation automatically, based on selecting 210 a candidate and/or based upon an input from the initiator and/or an administrator. (As noted above, it will be understood that, in certain embodiments, an administrator may implement CSC process 20 on behalf of an initiator in order to facilitate selecting collaborators for the initiator.) The format, amount of detail, method of communication, and so on of a provided 212 invitation may be based upon, for example, preferences associated with the initiator, the selected 210 candidate, an administrator, and so on. In certain embodiments, CSC process 20 may provide 212 multiple invitations to a particular selected 210 candidate. For example, if a selected 210 candidate does not respond to an email or a phone call to an office phone, CSC process 20 may provide 212 a text message to the selected 210 candidate's cell phone inviting the candidate to collaborate with the initiator and/or may provide 212 a later invitation by phone call to the office phone.

CSC process 20 may receive a response to the provided 212 invitation indicating whether the invitation has been accepted. In certain embodiments, CSC process 20 may receive an implicit response from a potential collaborator, indicating whether or not the provided 212 invitation has been accepted. For example, CSC process 20 may determine, based upon a potential collaborator not answering her telephone, not responding to an email invitation, and so on, that the potential collaborator is unwilling and/or unavailable to collaborate and/or has otherwise not accepted the invitation. In certain embodiments, CSC process 20 may receive an explicit indication from a potential collaborator, indicating whether or not the provided 212 invitation has been accepted. For example, CSC process 20 may determine, based upon a potential collaborator selecting a particular action icon in an emailed invitation that the potential collaborator is (or is not) willing and/or available to collaborate. In certain embodiments, CSC process 20 may provide 212 an invitation including prompts for detailed input from a potential collaborator regarding the potential collaborator's willingness, availability, and so on and, accordingly, may receive a response from the potential collaborator including detailed information regarding the same. For example, in response to such an invitation, a potential collaborator may indicate that she is willing to collaborate, but will not be available to do so until later in the day. CSC process 20 may, for example, utilize such a response to inform determining 202 subsequent contact scores relating to that potential collaborator (e.g., determined 202 contact scores that reflect high willingness 206 and availability 204 that varies depending on the time of day).

In certain embodiments, the number and/or type of provided 212 invitations may be based upon, at least in part, user and/or administrator preferences and/or other information. For example, in certain embodiments, certain potential collaborators may be very highly ranked in the determined 208 ranking order and/or may be designated as highly preferred collaborators based on initiator or administrator preferences. As such, CSC process 20 may provide 212 multiple simultaneous and/or sequential invitations to such potential collaborators using a variety of channels, in order to increase the chances that an invitation will reach the selected 210 potential collaborator. In certain embodiments, certain potential collaborators may be determined to not be receptive to multiple invitations. For example, based upon administrator preferences, CSC process 20 may determine that a particular selected 210 potential collaborator is a high-ranking manager and should accordingly not be disturbed unnecessarily. As such, CSC process 20 may provide 212 only a single invitation to such a potential collaborator and/or may provide 212 an invitation only through non-obtrusive means and/or during an appropriate time frame.

In certain embodiments, CSC process 20 may include various limitations on the number of invitations provided 212, the number of candidates selected 210, the length of time spent searching for a collaborator for a particular project, and so on. For example, based on default, administrator and/or other preferences, CSC process 20 may operate until it has successfully connected an initiator and a desired number of collaborators, and/or it has provided 212 twenty-five total invitations, provided 212 invitations to twenty-five distinct potential collaborators, and so on. In this way, for example CSC process 20 may facilitate an initiator engaging with other activities while CSC process 20 searches for collaborators. In certain embodiments, upon reaching a particular limitation (e.g., a number of invitations provided 212 or an amount of time spent searching for a collaborator) CSC process 20 may prompt an initiator and/or an administrator for input regarding further operation. For example, CSC process 20 may prompt an initiator/administrator to provide information regarding expanding and/or exchanging the received 200 set of collaboration candidates, providing 212 repeat invitations, pausing the search, extending the search, and so on. CSC process 20 may similarly prompt an initiator/administrator for input if, for example, a provided 212 invitation is not accepted, a potential collaborator preferred by the initiator/administrator (e.g., as determined based on initiator/administrative input or preferences) is determined to have low current willingness 206 or availability 204, and so on.

If the provided 212 invitation is accepted, CSC process 20 may establish 214 a communication channel connection between the initiator and the selected/invited candidate. For example, if the provided 212 invitation is accepted CSC process 20 may connect the initiator and the selected 210 candidate using a telephone connection, a video-call connection, a chat connection, and so on. CSC process 20 may establish 214 a communication channel connection based upon a variety of factors such as preference information of one or more groups or individuals, input from the initiator, the selected 210 candidate, and/or an administrator, and so on. For example, in certain embodiments, CSC process 20 may notify an initiator (and/or administrator) that a potential collaborator has responded favorably to a provided 212 invitation and may receive an input from the initiator (and/or administrator) regarding whether the initiator (and/or administrator) wishes to be connected to the potential collaborator over a particular communication channel (and/or whether the initiator wishes to be connected to the potential collaborator at all). Similarly, in certain embodiments, CSC process 20 may select a particular communication channel based upon a preference and/or input of the potential collaborator. For example, as part of accepting a provided 212 invitation a potential collaborator may indicate that she prefers to collaborate over video-chat. As such, CSC process 20 may establish 214 a connection between the collaborator and the initiator over a video-chat channel. In certain embodiments, when CSC process 20 receives an affirmative response to a provided 212 invitation, the initiator may not be immediately available for collaboration (e.g., because she was pulled into an urgent telephone call with another project team). In this case, for example, it may be useful for CSC process 20 to delay establishing 214 a communication channel between the initiator and the confirmed collaborator until the initiator (and, potentially, the collaborator) becomes available.

In certain embodiments the established 214 connection may include, for example, another invitation. For example, if the collaboration is expected to require a two-hour in-person meeting, CSC process 20 may establish 214 a connection through which an invitation from the initiator to a meeting (e.g., in a conference room) is provided to the selected 210 candidate. CSC process 20 may establish 214 a connection automatically, based, for example on the invitation and/or an acceptance of the invitation form the collaborator.

As noted above, it will be understood that CSC process 20 may be initiated by an individual who is not the initiator (e.g., an administrator). In such a case, CSC process 20 may, for example, establish a connection between the initiator and the selected member even though CSC process 20 was initiated by a different individual. For example, an administrator may seek collaborators for another individual as a proxy, in which case CSC process 20 may establish 214 a connection between the other individual and the selected potential collaborator.

If the provided 212 invitation is not accepted, CSC process 20 may engage in an iterative process to select 210 another candidate for collaboration and so on. For example, in response to a potential collaborator declining a provided 212 invitation (or, for example, failing to answer the invitation) CSC process 20 may determine 202 subsequent contact scores for the received 200 set of collaborators, including, potentially, the potential collaborator who did not accept the provided 212 invitation. For example, after an individual declines an invitation, CSC process 20 may determine 202 a subsequent (i.e., new) contact score for that individual (in which, for example, the declined invitation informs determination of a subsequent willingness 206 or availability 204). CSC process 20 may additionally/alternatively determine 202 a subsequent contact score for other individuals in the received 200 set of potential collaborators (and/or may preserve a determined 202 initial contact score for one or more of those individuals). Based upon these determined 202 subsequent (and/or initial) contact scores, CSC process 20 may determine 208 a subsequent ranking order, select 210 a candidate for collaboration based on that subsequent ranking order (and/or other factors) and provide 212 an invitation to collaborate to the selected 210 candidate. If this invitation is accepted, CSC process 20 may establish 214 a communication channel between the initiator and the newly selected 210 candidate. If this invitation is not accepted, CSC process 20 may repeat all of some of the processes above (e.g., in an iterative fashion).

In certain embodiments, if no response is received from a selected 210 potential collaborator, CSC process 20 may provide a message to the potential collaborator regarding the desired collaboration. For example, CSC process 20 may provide an email to the potential collaborator notifying her that the initiator wanted to collaborate on a particular project at a particular time. In certain embodiments, CSC process 20 may facilitate input from the potential collaborator in response to such a message indicating, for example, a later desire to collaborate. For example, if an earlier selected 210 potential collaborator becomes available some time after the invitation is provided 212 to her, and no other potential collaborator has accepted a provided 212 invitation, the earlier-selected 210 potential collaborator may respond to a prompt in such a message indicating that she is now available and/or willing to collaborate. This may result, for example, in CSC process 20 establishing 214 a communication channel connection between that collaborator and the initiator. Similarly, as also noted above, in certain embodiments, CSC process 20 may facilitate a potential collaborator, in response, for example, to a provided 212 invitation, to indicate certain times during which he may be available and/or willing to collaborate. For example, a selected 210 potential collaborator may be currently unavailable, but may respond to a provided 212 invitation with a text message (or email, or phone call, and so on) indicating to CSC process 20 that the he may be available (and willing) to collaborate later in the afternoon. This may in turn, for example, result in an adjusted determined 202 subsequent contact score for that potential collaborator that reflects the current lack of availability 204 as well as the potentially higher availability 204 at a later time.

In certain embodiments, the membership of the set of candidates may change following an initial (and/or other) invitation and/or at another time based upon, for example, changed availability 204 and/or willingness 206 of various potential collaborators, and/or other factors. For example, based on a selected 210 candidate's response to a provided 212 invitation, CSC process 20 may determine that candidate to have essentially no willingness 206 (and/or availability 204) to collaborate on the instant project. As such, for example, CSC process 20 may not include that candidate in a subsequent determined 208 ranking order. In certain embodiments, for example, an received 200 set of candidates may grow as CSC process 20 operates, as additional potential collaborators are received, become available, and so on.

As also noted above, it will be understood that a subsequent willingness 206, availability 204, contact score, ranking order, and so on may vary from or may be the same as an initial willingness 206, availability 204, contact score, ranking order, and so on. As such, it will be understood that CSC process 20 may select 210 an initial candidate based upon an initial ranking score that may be different from or may be the same as a subsequent candidate selected 210 based upon a subsequent ranking score.

As also noted above, willingness 206 may be determined based upon a variety of factors. For example, willingness 206 may be determined based upon a strength of a relationship 216 with the initiator. For example, in certain embodiments directory information, profile information, social networking information, and so on may indicate a variety of relationships and strengths of relationships 216 between a potential collaborator and an initiator. For example, various information may indicate that a potential collaborator and an initiator are friends, colleagues, supervisor and subordinate, family members, classmates, and so on. Further, in certain embodiments various information may indicate that such a relationship is of a particular strength. For example, information regarding historical collaboration (e.g., participation on many projects together) may indicate that a relationship between colleagues is particularly strong. In certain embodiments, CSC process 20 may analyze communication and other patterns to determine a strength of a relationship 216. For example, based on a high volume of social networking interactions between two classmates, CSC process 20 may determine that those two classmates have a stronger relationship than two different classmates who interact less frequency over a social network.

Willingness 206 may be determined based upon determining an online status 218. For example, using a CA (and/or other application or process) a potential collaborator may indicate a particular online status such as "busy," "working hard," "with the family," and so on, that may indicate that although the potential collaborator is available (i.e., may be reached using one or more electronic communication channels) she is not likely to be willing to collaborate (i.e., because busy, working hard, with her family, and so on). As such, online status 218 may be utilized to determine a particular willingness 206 to collaborate.

In certain embodiments, willingness 206 may be determined based upon involvement in a competing activity 220. For example, if a potential collaborator is currently participating in a conference call, leading an online presentation, conducting a lab experiment, and so on, the potential collaborator may be less willing to collaborate with an initiator even though the potential collaborator may, for example, be accessible via one or more communication channels. CSC process 20 may determine a competing activity 218 in a variety of ways. For example, CSC process 20 may utilized calendar information associated with a potential collaborator in order to determine that the potential collaborator has a squash game scheduled from 10-11 AM and may therefore be unwilling to collaborate during those times (even though, for example, the collaborator may be accessible via his cell phone). A competing activity 218 may be a current activity and/or a future activity. For example, CSC process 20 may determine that a particular collaboration may require more than two hours of work (e.g., based on an input from an initiator or analysis of historical collaborations to determine an estimated completion time) and may determine that a particular potential collaborator has a video conference with his supervisor in exactly two hours. As such, CSC process 20 may determine that the video conference may conflict with projected length of collaboration (e.g., because full collaboration would give the potential collaborator little opportunity to prepare for his video conference) and may accordingly determine that the willingness 206 of the potential collaborator may be low.

As also noted above, in certain embodiments, CSC process 20 may determine willingness 206 based upon historical collaboration pattern 222. For example, CSC process 20 may analyze the results of prior invitations to a particular collaborator, prior collaborations (or lack of collaboration) between the collaborator and the initiator (and/or other individuals), and so on in order to determine whether the collaborator has been historically willing to collaborate on a particular project, with a particular collaborator, at a particular time, and so on. CSC process 20 may, for example, analyze historical collaboration patterns 222 with respect to a particular initiator, a particular type of collaboration, a particular subject area, a particular time of day or day of the week, a particular type or number of invitations, and so on. In certain embodiments, to facilitate analyzing historical collaboration patterns 222 (and/or other functionality), CSC process 20 may prompt initiators and/or collaborators, after a particular historical collaboration (e.g., a collaboration facilitated by CSC process 20), to provide one or more ratings for the instant collaborator and/or collaboration. For example, CSC process 20 may receive input regarding the timeliness, usefulness, success, compatibility, and so on of the collaboration and/or the collaborator, which may inform analysis of historical collaboration patterns 218. In this way, for example, collaborators receiving high ratings from an initiator (and/or providing high ratings for the initiator) may be determined to have higher willingness 206 with regard to collaborating with that initiator than collaborators receiving (and/or providing) lower ratings.

As also noted above, availability 204 may be determined based upon a variety of factors. For example, CSC process 20 may determine availability based upon determining online status 224. For example, if a collaborator is determined, based upon online status 224, to be active with respect to a CA account, CSC process 20 may determine that the collaborator has a higher availability 204 (i.e., because the collaborator may be accessible for collaboration using the particular CA account. Similarly, for example, if a collaborator indicates via a social networking account that he is "at work," this may indicate that the collaborator is accessible using various communication channels associated with his work and that he may therefore have a high availability 204.

In certain embodiments, availability 204 may be determined based upon identifying recent online activity 226. For example, if a collaborator has recently posted to a microblog, edited a webpage, actively engaged with a social networking application, and so on, this may indicate that the collaborator may be reachable using a communication channel associated with that activity (e.g., a messaging service, an email account, the social networking application, and so on) and/or another communication channel and that the collaborator may therefore have high availability 204. If a collaborator has not recently posted to a micro-blog, edited a webpage, actively engaged with a social networking application, and so on, this may indicate that the collaborator may not be reachable using certain communication channels and that the collaborator therefore may have a low availability 204.

In certain embodiments, availability 204 may be determined based upon identifying a calendar entry 228. For example, if a calendar entry indicates that a collaborator may be out of the office on Tuesday afternoon, CSC process 20 may determine that the individual accordingly has low availability 204.

In certain embodiments, availability 204 may be determined based upon identifying records of communication devices and/or channels that are currently in use and/or have been historically used at a similar time. For example, CSC process 20 may determine based on directory information that a particular collaborator may be accessible via an office phone, a cell phone, an email address, and a text messaging service. CSC process 20 may further determine that, for example, the collaborator is currently talking on the office phone (and/or that the collaborator is usually talking on the office phone at similar historical times). As such, for example, CSC process 20 may determine that the collaborator may have a low availability 204.

In certain embodiments, availability 204 may be determined based upon determining a "nearness" (i.e., whether a potential collaborator is nearby a communication device and/or channel and/or other necessary resources). For example, based on GPS information associated with a cell phone and/or other location information, CSC process 20 may determine that a potential collaborator is nearby a conference room that has both a video conference equipment and a library of textbooks that may be useful to a particular collaboration. As such, for example, CSC process 20 may determine that the potential collaborator, based upon the determined "nearness," may have a high availability 204.

It will be understood that willingness 206, availability 204, determining 202 contact scores and/or various other aspects of CSC process 20 may be determined based upon input and/or preferences from an initiator, an administrator, a collaborator, and so on. For example, a potential collaborator may create a profile using CSC process 20 through which the potential collaborator indicates a generally high willingness to collaborate on a particular type of project, regarding a particular subject area, with a particular initiator, and so on. Similarly, a potential collaborator may create a profile using CSC process 20 through which the potential collaborator indicates that she is usually available during certain time periods.

It will be understood that the examples above regarding determining willingness 206, availability 204 and determining 202 contact scores are not intended to be exhaustive and that various other factors and analyses may contribute to these aspects of CSC process 20. It will be further understood that aspects of the various examples above (and/or others) may be utilized in various combinations by CSC process 20 in order, for example, to determine 202 contact scores based upon willingness 206 and availability 204. For example, in certain embodiments CSC process 20 may determine willingness 206 based upon strength of a relationship 216 and online status 218 and may determine availability 204 based upon identifying recent online activity 226 and identifying calendar entries 228.

Figure 3:
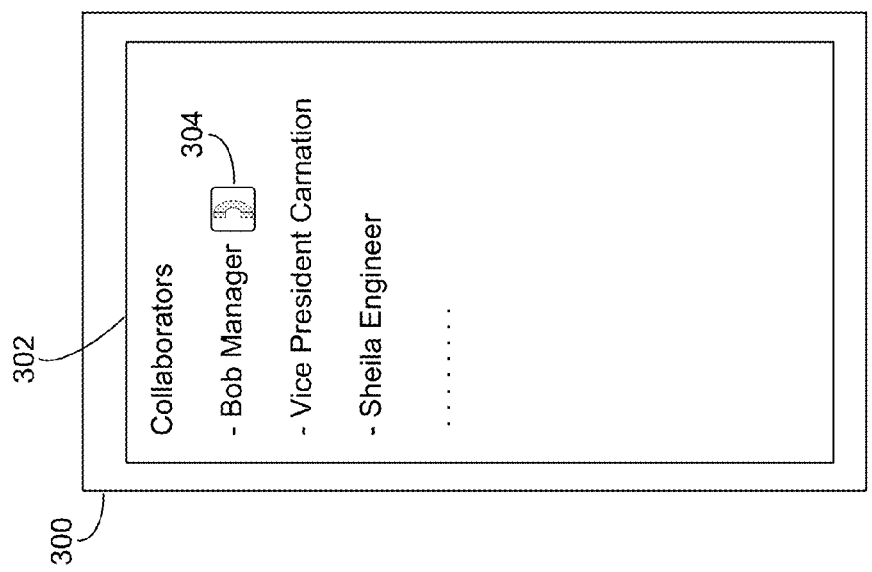
FIG. 3 is a diagrammatic view of an implementation of the collaborator selection and contacting process of FIG. 1.

Referring now also to FIG. 3, a diagrammatic view of an aspect of CSC process 20 is presented. In certain embodiments, CSC process 20 may, for example, display window 300 to an initiator in order to apprise the initiator of the progress of a search for a suitable collaborator. For example, as part of window 300, CSC process 20 may display list 302 of received 200 set of potential collaborators. As part of list 302, CSC process 20 may, for example, indicate the determined 208 ranking of the received 200 potential collaborators by, for example, presenting the various potential collaborators in a certain order. CSC process 20 may, in certain embodiments, indicate that an invitation is currently being provided 212 to a particular potential collaborator. For example, phone icon 304 next to the name "Bob Manager" may indicate that CSC process 20 is currently providing 212 to Bob Manager, over a landline phone, an invitation to collaborate.

Figure 4:
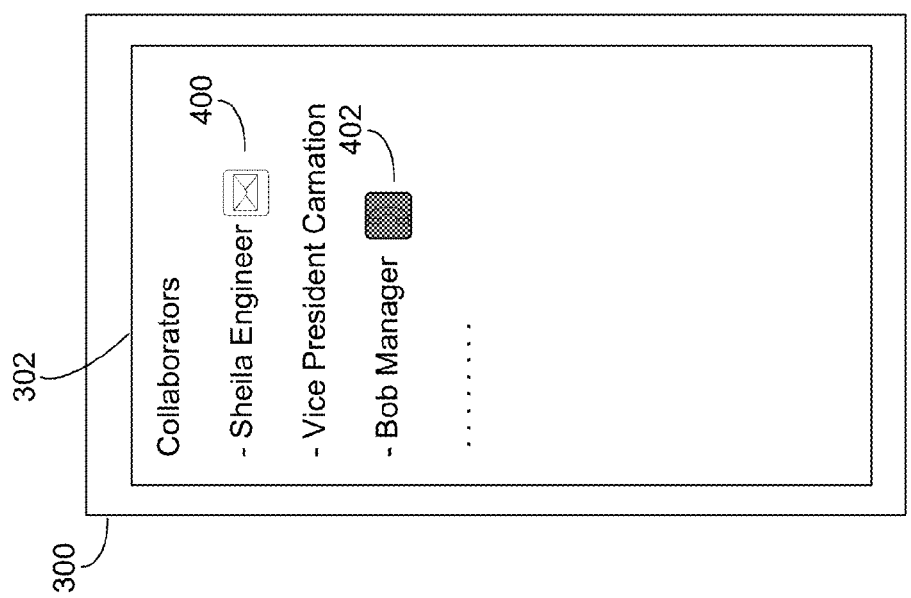
FIG. 4 is a diagrammatic view of an implementation of the collaborator selection and contacting process of FIG. 1.

Referring now also to FIG. 4, and continuing the example above, Bob Manager may have failed to respond to (or may have declined) the invitation provided 212 over his office phone. As such, CSC process 20 may have determined 202 subsequent contact scores for the various collaborators and may have accordingly rearranged the order of the potential collaborators in list 302 (i.e., to indicate a subsequent determined 208 ranking of the candidates). Because Sheila Engineer is now at the top of the determined 208 ranking, CSC process 20 may provide 212 to Sheila Engineer an invitation to collaborate. CSC process 20 may indicate that the invitation is being provided 212 via email using email icon 400. CSC process 20 may further indicate that the telephone invitation provided 212 to Bob Manager was unsuccessful by displaying darkened phone icon 402. In certain embodiments, additional information may be available to an initiator (and/or administrator) via window 300. For example, in certain embodiments an initiator may click on darkened phone icon 402 to see information regarding the provided 212 invitation to Bob Manager (e.g., date, time, duration, phone number, response, and so on) and/or other information (e.g., that Bob Manager is expected to be more available at a later time).

Figure 5:
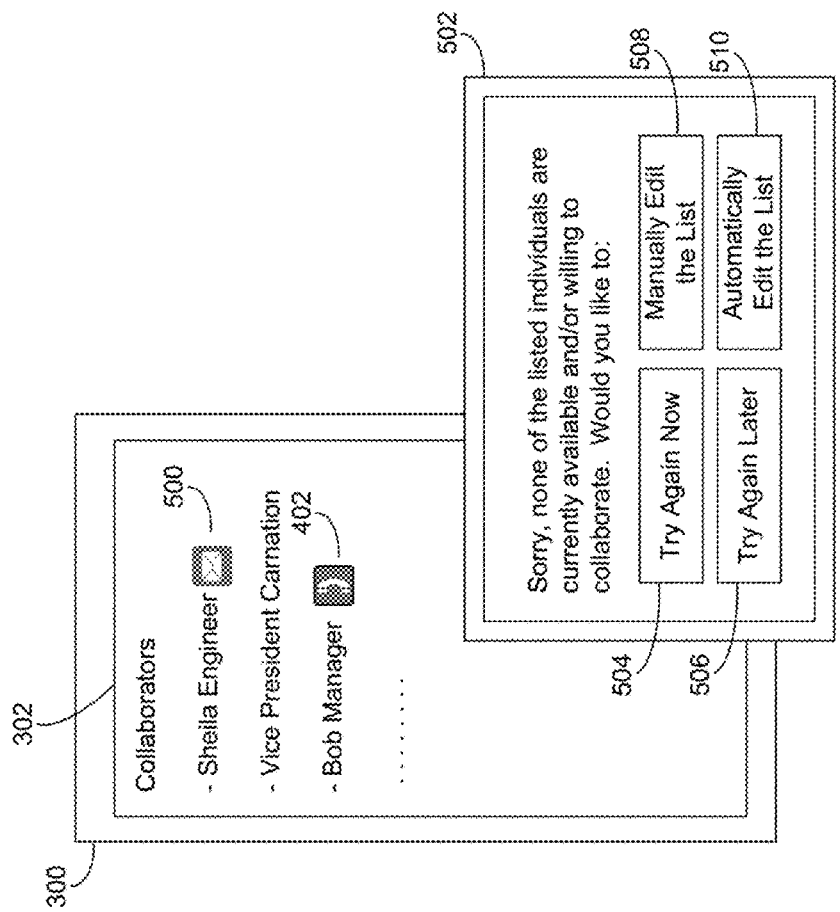
FIG. 5 is a diagrammatic view of an implementation of the collaborator selection and contacting process of FIG. 1.

Referring now also to FIG. 5, and continuing the example above, the invitation to Sheila Engineer may have been declined, as may be indicated by darkened email icon 500. Further, for example, analysis of calendar entry 228 may indicate that Vice President Carnation is no longer available and/or willing to collaborate (e.g., because he is in a board meeting). As such, none of the collaborators included in list 302 may be available and/or willing to collaborate with the initiator. Accordingly, for example, CSC process 20 may provide alert 502 to the initiator (and/or an administrator acting as a proxy for the initiator). Alert 502 may notify the initiator (and/or administrator) that no collaborators are available and/or willing to collaborate. Alert 502 may additionally/alternatively prompt the initiator (and/or administrator) for input regarding various parameters. For example, CSC process 20 may facilitate an initiator requesting additional iterations of CSC process 20, now or in the future, via action buttons 504 and 506, respectively. Similarly, CSC process 20 may, for example, facilitate an initiator requesting additional iterations of CSC process 20 with a different set of potential collaborators. For example, using action button 508 an initiator may indicate a desire to manually edit the set of potential collaborators (i.e., to manually add and/or subtract various collaborators, manually adjust the ranking order, and so on). Using action button 510 an initiator may indicate a desire to automatically edit the set of potential collaborators (i.e., to prompt CSC process 20 to supplement and/or replace the set of potential collaborators using various automatic functionality).

Figure 6:
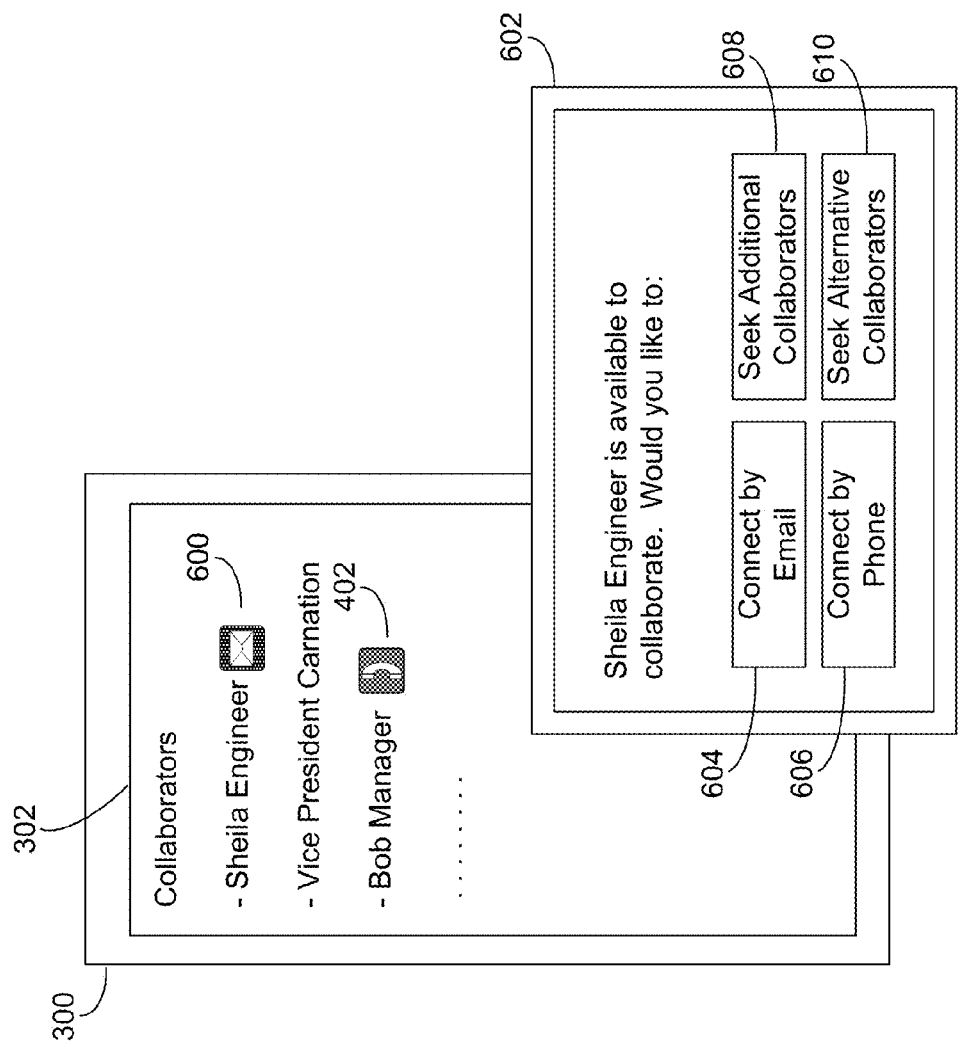
FIG. 6 is a diagrammatic view of an implementation of the collaborator selection and contacting process of FIG. 1.

Referring now also to FIG. 6, and continuing the example above, CSC process 20 may have provided 212 an invitation to Sheila Engineer and Sheila may have accepted the invitation, as indicated, for example, by colored email icon 600. In order, for example, to establish 214 an appropriate communication channel connection between the initiator and Sheila, CSC process 20 may provide input window 602 to the initiator (and/or an administrator acting as a proxy for the initiator). Input window 602 may for example, facilitate an initiator (and/or administrator) indicating a preference to connect to Sheila by email or to connect to Sheila by telephone, using action buttons 604 and 606, respectively. In certain embodiments, input window 602 may facilitate an initiator indicating that he would prefer other collaborators in addition or as an alternative to Sheila Engineer. For example, using action button 608, an initiator may indicate that he would like to collaborate with Sheila, but would also like CSC process 20 to continue to seek additional collaborators. Using action button 610, an initiator may indicate that he would not like to collaborate with Sheila, and would like CSC process 20 to seek alternative collaborators.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, a set of candidates for collaboration with an initiator;
   determining, by the one or more computing devices, a first initial contact score for a first member of the set of candidates based upon, at least in part, one or more of a first initial availability associated with the first member and a first initial willingness associated with the first member, wherein the first initial availability is determined based upon, at least in part, Global Positioning System (GPS) information of the first member;
   determining, by the one or more computing devices, a second initial contact score for a second member of the set of candidates based upon, at least in part, one or more of a second initial availability associated with the second member and a second initial willingness associated with the second member;
   determining, by the one or more computing devices, an initial ranking order for the set of candidates based upon, at least in part, one or more of the first initial contact score and the second initial contact score;
   selecting, by the one or more computing devices, a first selected member from the set of candidates based upon, at least in part, the initial ranking order;
   providing, by the one or more computing devices, a first invitation to the first selected member to collaborate via one or more communication channels; and
   receiving, by the one or more computing devices, a response to the first invitation, wherein the response to the first invitation includes one or more of accepting the first invitation and not accepting the first invitation;
   in response to receiving a response to the first invitation accepting the first invitation, establishing, by the one or more computing devices, a communication channel connection between the first selected member and the initiator; and
   in response to receiving a response to the first invitation not accepting the first invitation,
      associating, by the one or more computing devices, a first subsequent contact score with the first selected member, wherein the first subsequent contact score is based upon, at least in part, one or more of a first subsequent availability associated with the first selected member and a first subsequent willingness associated with the first selected member;
      determining, by the one or more computing devices, a subsequent ranking order for the set of candidates based upon, at least in part, one or more of the first initial contact score, the second initial contact score, and the first subsequent contact score;
      selecting, by the one or more computing devices, a second selected member from the set of candidates based upon, at least in part, the subsequent ranking order; and providing, by the one or more computing devices, a second invitation to the second selected member to collaborate;

receiving, by the one or more computing devices, a response to the second invitation, wherein the response to the second invitation includes one or more of accepting the second invitation and not accepting the second invitation;

in response to receiving a response to the second invitation not accepting the second invitation, associating a second subsequent contact score with the second selected member;

iteratively determining a subsequent ranking order based upon, at least in part, one or more of the second initial score and the second subsequent score, and iteratively providing one or more additional invitations to the set of candidates to collaborate based upon, at least in part, a limitation is reached for a length of time searching for the set of candidates and a number of invitations provided to the set of candidates.

2. The computer-implemented method of claim 1 wherein one or more of the first initial willingness, the second initial willingness, and the first subsequent willingness is determined based upon, at least in part, determining a strength of a relationship with the initiator.

3. The computer-implemented method of claim 1 wherein one or more of the first initial willingness, the second initial willingness, and the first subsequent willingness is determined based upon, at least in part, determining an online status.

4. The computer-implemented method of claim 1 wherein one or more of the first initial willingness, the second initial willingness, and the first subsequent willingness is determined based upon, at least in part, determining an involvement in a competing activity.

5. The computer-implemented method of claim 1 wherein one or more of the first initial willingness, the second initial willingness, and the first subsequent willingness is determined based upon, at least in part, determining a historical collaboration pattern.

6. The computer-implemented method of claim 1 wherein one or more of the first initial availability, the second initial availability, and the first subsequent availability is determined based upon, at least in part, determining an online status.

7. The computer-implemented method of claim 1 wherein one or more of the first initial availability, the second initial availability, and the first subsequent availability is determined based upon, at least in part, identifying a recent online activity.

8. The computer-implemented method of claim 1 wherein one or more of the first initial availability, the second initial availability, and the first subsequent availability is determined based upon, at least in part, identifying a calendar entry.

9. The computer-implemented method of claim 1 further comprising:

alerting, by one or more computing devices, that none of the candidates of the set of candidates are available.

10. The computer-implemented method of claim 1 wherein the first invitation is provided via one or more communication channels and wherein a first invitation indicator, showing that the first invitation is being provided to the first selected member and describing the one or more communication channels used to provide the first invitation to the first member, is displayed at a user interface.

11. A computer-implemented method comprising:

receiving, by one or more computing devices, a set of candidates for collaboration with an initiator;

determining, by the one or more computing devices, a first initial contact score for a first member of the set of candidates based upon, at least in part, one or more of a first initial availability associated with the first member and a first initial willingness associated with the first member, wherein the first initial availability is determined based upon, at least in part, Global Positioning System (GPS) information of the first member;

determining, by the one or more computing devices, a second initial contact score for a second member of the set of candidates based upon, at least in part, one or more of a second initial availability associated with the second member and a second initial willingness associated with the second member;

determining, by the one or more computing devices, an initial ranking order for the set of candidates based upon, at least in part, one or more of the first initial contact score and the second initial contact score;

selecting, by the one or more computing devices, a first selected member from the set of candidates based upon, at least in part, the initial ranking order;

providing, by the one or more computing devices, a first invitation to the first selected member to collaborate via one or more communication channels; and receiving, by the one or more computing devices, a response to the first invitation, wherein the response to the first invitation includes one or more of accepting the first invitation and not accepting the first invitation;

in response to receiving a response to the first invitation accepting the first invitation, establishing, by the one or more computing devices, a communication channel connection between the first selected member and the initiator; and in response to receiving a response to the first invitation not accepting the first invitation, associating, by the one or more computing devices, a first subsequent contact score with the first selected member, wherein the first subsequent contact score is based upon, at least in part, one or more of a first subsequent availability associated with the first selected member and a first subsequent willingness associated with the first selected member;

determining, by the one or more computing devices, a subsequent ranking order for the portion of the set of candidates based upon, at least in part, one or more of the first initial contact score, the second initial contact score, and the first subsequent contact score;

selecting, by the one or more computing devices, a second selected member from the set of candidates based upon, at least in part, the subsequent ranking order; and providing, by the one or more computing devices, a second invitation the second selected member to collaborate;

receiving, by the one or more computing devices, a response to the second invitation, wherein the response to the second invitation includes one or more of accepting the second invitation and not accepting the second invitation;

in response to receiving a response to the second invitation not accepting the second invitation, associating a second subsequent contact score with the second selected member;

iteratively determining a subsequent ranking order based upon, at least in part, one or more of the second initial score and the second subsequent score, and iteratively providing one or more additional invitations to the set of candidates to collaborate based upon, at least in part, a limitation is reached for a length of time searching for the set of candidates and a number of invitations provided to the set of candidates;

wherein one or more of the first initial willingness, the second initial willingness, and the first subsequent willingness is determined based upon, at least in part, determining a historical collaboration pattern; and wherein one or more of the first initial availability, the second initial availability, and the first subsequent availability is determined based upon, at least in part, identifying a recent online activity.

12. The computer-implemented method of claim 11 further comprising:

alerting, by one or more computing devices, that none of the candidates of the set of candidates are available.

13. The computer-implemented method of claim 11 wherein the first invitation is provided via one or more communication channels and wherein a first invitation indicator, showing that the first invitation is being provided to the first selected member and describing the one or more communication channels used to provide the first invitation to the first member, is displayed at a user interface.

* * * * *